United States Patent Office 3,517,067
Patented June 23, 1970

3,517,067
SYNTHESES OF QUATERNARY
PHOSPHONIUM SALTS
Max H. Stern, Rochester, N.Y., assignor to Eastman
Kodak Company, Rochester, N.Y., a corporation of
New Jersey
No Drawing. Filed Feb. 11, 1964, Ser. No. 343,963
Int. Cl. C07f 9/54; C07c 13/28; C07e 1/00
U.S. Cl. 260—606.5
19 Claims

ABSTRACT OF THE DISCLOSURE

Process for making a quaternary phosphonium salt such as retinyl triphenyl phosphonium chloride by reacting an ester such as an ester of retinol with a hydrosalt of a tertiary phosphine. The hydrosalt can be formed in situ by the reaction of a tertiary phosphine with an acid such as hydrogen chloride. These compounds are useful as intermediates in the synthesis of, for example, a cortenoid compound useful as a feed additive for poultry for pigmenting poultry skin and eggs.

---

This invention pertains to organic chemistry. More particularly, it relates to the syntheses of certain quaternary phosphonium salts.

The quaternary phosphonium salts involved in this invention are compounds represented by the Formula I:

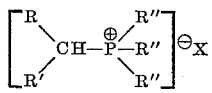

wherein R is selected from the group consisting of hydrogen and methyl radicals, R' is selected from the group consisting of (1) aliphatic, carbocyclic and carbocyclic-aliphatic radicals, each of which has olefinic unsaturation at least at the α carbon atom, and (2) carbalkoxy radicals wherein the alkoxy moieties have 1–8 carbon atoms, each R" is independently selected from the group consisting of substituted and unsubstituted, saturated and unsaturated, aliphatic, carbocyclic and carbocyclic-aliphatic radicals, and X is an anion of a strong acid. These compounds are useful as intermediates in the synthesis of other compounds. For example, one of the quaternary phosphonium salts involved in this invention is retinyl (also known as axerophthyl) triphenylphosphonium salt. This is a compound represented by the Formula II:

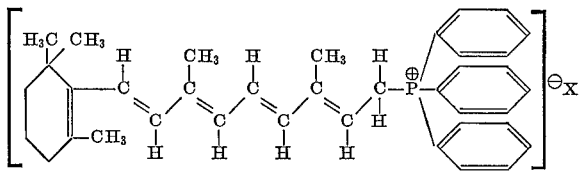

wherein X is an anion of a strong acid. This compound has utility as an intermediate in the synthesis of β-carotene by a known process. In this process, the retinyl triphenylphosphonium salt is reacted with (1) a base such as potassium hydroxide and (2) retinal in a suitable liquid reaction medium, whereby β-carotene is formed. Heretofore, retinyl triphenylphosphonium salt has been made by reacting retinol with a triphenylphosphine salt in methanol. This invention in its more specific aspects provides another process for making it.

This invention is based upon the discovery that quaternary phosphonium salts represented by the formula I can be made directly from esters of aliphatic carboxylic acids and alcohols, which esters have the following Formula III.

In summary, this invention comprises a process for making a quaternary phosphonium salt represented by Formula I, which process comprises: admixing (A) an ester represented by the Formula III:

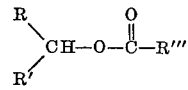

wherein R and R' have the same significance as in Formula I and R''' is an aliphatic hydrocarbon radical, and (B) a tertiary phosphine hydrosalt represented by the Formula IV:

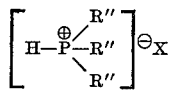

wherein R" and X have the same significance as in Formula I, whereby a reaction product consisting essentially of a quaternary phosphonium salt represented by Formula I is formed. The chemical reaction that is involved is represented by the following equation:

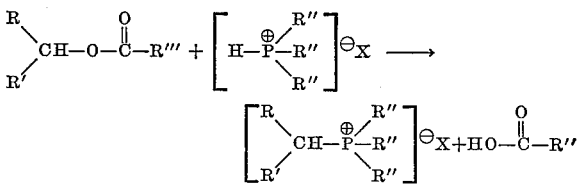

Esters represented by Formula III constitute a class of compounds too numerous to list here. In general they can be regarded as compounds derived from either primary or secondary alcohols and aliphatic carboxylic acids. In this connection, under the concepts of this invention there do not appear to be any limitations on the aliphatic hydrocarbon radical R''' and thus on the aliphatic carboxylic acid. Examples of esters of Formula III include the retinyl esters also known as esters of retinol or axerophthol such as retinyl acetate, retinyl propionate, retinyl palmitate, retinyl acrylate and the like. Retinyl esters of aliphatic carboxylic acids as a class have far greater chemical stability than retinol. Hence, the process of this invention in connection with the synthesis of retinyl triphenylphosphine salt has a feature of advantage in that the reaction product obtained thereby is relatively free of side products such as dehydroretinyl triphenylphosphonium salt, which often accompany retinyl triphenylphosphonium salt when it is made from retinol. Other examples of esters of Formula III include β-ionylidene ethyl acetate, β-ionyl acetate, cinnamyl acetate, benzyl acetate, allyl acetate and ethyl lactyl acetate.

A tertiary phosphine salt of the Formula IV is a compound that is formed when a tertiary phosphine represented by Formula V:

wherein each R" has the same significance as in Formula I, and a strong acid are mixed together under the conditions of this invention. Indeed, in prefered embodiments of this invention the tertiary phosphine salt is formed in situ in the reaction mixture. In these embodiments a strong acid is aded to the mixture of an ester of Formula III and tertiary phosphine of Formula V, whereupon a tertiary phosphine salt is formed, which in turn reacts with the ester to form the desired quaternary phosphonium salt. Examples of a strong acid are hydrochloric acid, sulfuric acid, phosphoric acid, hydrobromic acid, p-toluenesulfonic acid and the like. In this connection, a strong acid is an acid having at 18–25° C. a dissociation constant (the first dissociation constant where more than one is involved) of at least $1\times10^{-2}$. Examples of tertiary phosphines (many of which are triaryl) include:

Triphenylphosphine
Tri-p-tolylphosphine
Tri-o-tolylphosphine
Tri-m-tolylphosphine
Tri-p-methoxyphenylphosphine
Tri-o-methoxyphenylphosphine
Tri-m-methoxyphenylphosphine
Tri-p-nitrophenylphosphine
Tri-o-nitrophenylphosphine
Tri-m-nitrophenylphosphine
Tri-p-chlorophenylphosphine
Tri-o-chlorophenylphosphine
Tri-m-chlorophenylphosphine
Tri-p-bromophenylphosphine
Tri-o-bromophenylphosphine
Tri-m-bromophenylphosphine
Tri-p-ethoxyphenylphosphine
Tribenzylphosphine
p-Dimethylaminophenyl diphenylphosphine
p-Dimethylaminophenyl dimethylphosphine
Diallylpenylphosphine
Tris-(2-cyanoethyl)phosphine
Dicyanoethyl phenylphosphine
Tricyclohexylphosphine
Cyclohexyldimethylphosphine
Triamylphosphine
Dicyclohexylmethylphenylphosphine
Dimethylphenylphosphine
Dimethyl p-nitrophenylphosphine
Dimethyl p-methoxyphenylphosphine
Dimethyl p-chlorophenylphosphine
Dimethyl p-bromophenylphosphine
Diallylmethylphosphine
Methyl diphenylphosphine
Ethyl diphenylphosphine In carrying out the process of this invention the quantities of ester and tertiary phosphine salt, or of ester, tertiary phosphine and strong acid, admixed together are preferably at least chemically equivalent. In other words, for a given quantity of ester there is admixed therewith preferably at least one chemically equivalent quantity of tertiary phosphine salt and preferably a small excess. For in situ formation of the tertiary phosphine salt the quantities of tertiary phosphine and strong acid employed are preferably at least chemically equivalent.

Preferably, admixing of the reactants is carried out in a liquid organic solvent reaction medium consisting essentially of at least one inert, $C_1$–$C_8$ alkyl, monohydric alcohol. Examples of such an alcohol are methanol, ethanol, butanol and the like.

The temperature at which admixing of the reactants is carried out is generally in a range from about 20 to about 150° C. although higher and lower temperatures can be employed. Temperatures above about 30° C. are not recommended in some embodiments, however, because the esters in these embodiments have enough instability at such temperatures as to give rise to unwanted by-products. Temperatures lower than about 20° C. are not recommended in all embodiments, however, because in some embodiments the reaction at such temperatures goes too slowly to be practical. In the case of retinyl esters and the quaternary phosphonium salts made therefrom according to this invention, the preferred reaction temperature is about 25–30° C.

The reaction time is generally in a range from about ½ hour to about 4 hours. Longer and shorter reaction times can be employed, however, depending on such factors as the quantity of reaction mixture and the reaction temperature or temperatures. In general, the smaller the quantity of reaction mixture the shorter the reaction time while the larger the quantity of reaction mixture the longer the reaction time. The higher the reaction temperature the shorter the reaction time while the lower the reaction temperature the longer the reaction time.

The order of addition of the reactants does not appear to be critical. However, in preferred embodiments of this invention, which are based on formation in situ of the tertiary phosphine salt, the ester and tertiary phosphine are dissolved at least for the most part in a monohydric lower alkyl alcohol to form a second reaction mixture portion. The two reaction mixture portions are then admixed, preferably by adding the second reaction mixture portion to the first reaction mixture portion with stirring, and the resulting reaction mixture is stirred for the desired reaction time at the desired reaction temperature or temperatures. In those preferred embodiments and other embodiments of this invention, which involve an air oxidation susceptible ester, for example, retinyl ester, it is recommended that the part of the mixing procedure involving the ester and then the desired quaternary phosphonium salt be preformed under an inert gas such as, for example, nitrogen, so as to minimize oxidative attack of the ester and the resulting quaternary phosphonium salt.

At the conclusion of the reaction time, the resulting reaction product can be treated by distillation and washing procedures to isolate the desired quaternary phosphonium salt. However, in the syntheses of various end products such as, for example, β-carotene, the quaternary phosphonium salt need not be isolated from the reaction product. In other words, the reaction product can be used directly in these syntheses.

This invention is further illustrated by the following examples of various aspects thereof, including specific embodiments. This invention is not limited to those specific embodiments unless otherwise indicated.

EXAMPLE 1

This example illustrates the preparation according to one embodiment of this invention of a product consisting essentially of a retinyl triphenylphosphonium salt.

1.16 grams (0.0035 mole) of retinyl acetate, 1.05 grams (0.004 mole) of triphenylphosphine and 2 milliliters of methanol are admixed at 25–30° C. under nitrogen in a reactor. To the resulting mixture, there is added with stirring at 25–30° C. a solution consisting of 0.15 grams (0.004 mole) of hydrogen chloride and 2 milliliters of methanol. The addition of the hydrogen chloride solution is over a period of about 30 minutes. The resulting clear solution is stirred at 25–30° C. for 2 hours in the reactor with air removed therefrom and replaced by nitrogen.

The reaction product in the reactor consists essentially of retinyl triphenylphosphonium chloride. A 0.5 milliliter aliquot portion of the reaction product, removed from the reactor and freed of solvent by distillation under vacuum, typically gives yellow solids. A typical ultraviolet absorption measurement of such solids is E(1%, 1 cm.) (339 m$\mu$, ethanol)=658. The infrared spectrum of the solids is typically similar to that of retinyl triphenylphosphonium chloride prepared from retinol.

EXAMPLE 2

This example illustrates the synthesis of β-carotene from the retinyl triphenylphosphonium chloride product made according to the process of Example 1.

The reaction product of Example 1 is added at the same time as a solution of 0.22 gram (0.0039 mole) of potassium hydroxide and 2 milliliters of methanol to a stirred slurry of 1.0 gram (0.0035 mole) of retinal in 3 milliliters of methanol previously cooled to −20° C. This addition is made as rapidly as possible, preferably by way of two separate dropping funnels and in about 10 seconds, and is carried out under nitrogen. The reaction mixture thus formed is stirred for one minute. After a period of about 10–15 minutes the reaction mixture, reddish-orange, solidifies. The solids are held at 0.5° C. for four hours and then at 25–30° C. for 18 hours. Thereafter, the solids are removed from the reactor, washed with methanol and water, and finally digested with 25 milliliters of warm methanol to remove phosphorus containing impurities. After cooling, the methanol is removed by filtration from the slurry, and the remaining solids dried under vacuum. The dry solids consist essentially of the desired product β-carotene. A typical quantity of β-carotene thus obtained is 1.33 grams, representing a 69% yield. A typical ultraviolet absorption measurement, starting with a retinyl triphenylphosphonium salt having the typical ultraviolet absorption measurement as set forth under Example 1, and with retinal having an ultraviolet absorption such as E(1%, 1 cm.) (381 m$\mu$, ethanol)=1510, is E(1%, 1 cm.) (455 m$\mu$, cyclohexane)=2110.

EXAMPLE 3

This example illustrates the preparation of a retinyl triphenylphosphonium salt according to another specific embodiment of the process of this invention.

2.0 grams of retinyl plamitate concentrate having a purity of 92% by weight (representing 0.0035 mole of retinyl palmitate) is admixed at 25–30° C. with 1.05 grams (0.004 mole) of triphenylphosphine and 2 milliliters of methanol. A solution of 0.15 gram (0.004 mole) of hydrogen chloride and 2 milliliters of methanol is added over a period of 30 minutes, with stirring at 25–30° C., to the mixture of retinyl palmiate, triphenylphosphine and methanol. Stirring of the resulting reaction mixture is continued at 25–30° C. until the insoluble retinyl palmitate is completely dissolved. This typically takes about 45 minutes.

The resulting reaction product consists essentially of retinyl triphenylphosphonium chloride. A typical ultraviolet absorption value obtained on a 0.5 milliliter sample of the reaction mixture, freed of solvent by distillation under vacuum, is E(1%, 1 cm.) (335 m$\mu$, ethanol)=410.

The reaction product is useful as such for the synthesis of β-carotene. Thus, it and a solution of 0.25 gram (0.0045 mole) of potassium hydroxide and 3 milliliters of methanol are added simultaneously to a stirred slurry of 1.26 grams (equivalent to 0.0036 mole of pure retinal) of retinal-hydroquinone complex in 4 milliliters of methanol, which slurry has been previously cooled to −20° C. This addition is made by 2 separate dropping funnels over a period of 10 seconds, and is followed by stirring of the resulting reaction mixture for one minute. The reddish-orange reaction mixture solidifies generally within about 10–15 minutes. The solids are held at 0–5° C. for four hours and then at 25–30° C. for 18 hours. Then, the solids are collected, washed with methanol and water and then digested with 25 milliliters of warm methanol to remove phosphorus containing impurities. After cooling, the methanol slurry is filtered and residual methanol removed under vacuum, giving thereby β-carotene. A typical quantity of β-carotene obtained under these conditions is 1.36 grams, representing about a 55% over-all yield based on the retinyl palmitate. With the retinyl triphenylphosphonium chloride reaction product having the foregoing ultraviolet absorption value and with a retinal-hydroquinone complex having an ultraviolet absorption value of E(1%, 1 cm.) (380 m$\mu$, ethanol)=1242, a typical ultraviolet absorption value for the β-carotene product is E(1%, 1 cm.) (455 m$\mu$, cyclohexane)=1830.

EXAMPLE 4

This example illustrates the preparation according to one embodiment of this invention of a β-ionylideneethyl triphenylphosphonium salt.

A solution consisting essentially of 0.183 gram (0.005 mole) of hydrogen chloride and 1.35 milliliters of methanol is added over a period of 20 minutes to a stirred mixture at 25–30° C. of 1.31 grams (0.005 mole) of β-ionylideneethyl acetate [E(1%, 1 cm.) (236 m$\mu$, 265 m$\mu$, ethanol)=537,523], 1.43 grams (0.0055 mole) of triphenylphosphine and 2 milliliters of methanol. Stirring of the resulting reaction mixture is continued for two hours at 25–30° C. The reaction product thus obtained consists essentially of β-ionylideneethyl triphenylphosphonium chloride as represented by the formula:

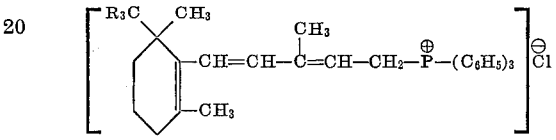

This can be verified by removing a 2 milliliter aliquot sample of the reaction product, freeing it of solvent and then running an ultraviolet absorption measurement and an infrared absorption measurement on it. A typical ultraviolet absorption measurement is E(1%, 1 cm.) (268 m$\mu$, 275 m$\mu$, cyclohexane)=302,308. Typically, a 2 milliliter aliquot portion of the reaction product contains about 0.77 gram of the salt and the remainder of the reaction product contains about 0.0035 mole of the salt.

β-Ionylideneethyl triphenylphosphonium salt is useful as an intermediate in the synthesis of the carotenoid 1,14-bis(2,6,6-trimethylcyclohex - 1 - enyl)-3,7,12-trimethyl-tetradec-1,3,5,7,9,11,13-heptaene which has the formula:

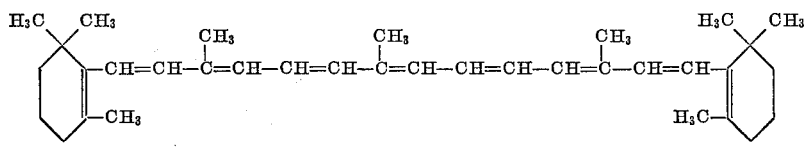

and which is useful in poultry feeds for pigmenting poultry skin and egg yolks. This carotenoid can be synthesized from the salt as follows.

Without removing the salt from the remainder of the reaction product, the salt is coupled to 1.0 gram (0.0035 mole) of retinal according to the procedure set forth in Example 2. A typical quantity of the product so obtained is 1.1 grams, representing a yield of about 66%. Such a product has about 91% purity and at such purity gives an ultraviolet absorption measurement of E(1%, 1 cm.) (416 m$\mu$, cyclohexane) of 1850. The melting point of the product is 139° C.

EXAMPLE 5

This example illustrates the preparation according to a specific embodiment of this invention of a β-ionyl triphenylphosphine salt.

A solution of 0.365 gram (0.01 mole) of hydrogen chloride and 2.7 milliliters of methanol is added over a period of 20 minutes to a stirred mixture at 25–30° C. of 2.52 grams (0.01 mole) of β-ionyl acetate [a typical ultraviolet absorption value is E(1%, 1 cm.) (238 m$\mu$, ethanol)=428], 2.86 grams (0.011 mole) of triphenylphosphine and 4 milliliters of methanol. The reaction mixture thus formed is stirred at 25–30° C. for two hours. There is thus formed a reaction product consisting essentially of β-ionyl triphenylphosphine chloride. This can be confirmed by removing a 2 milliliter aliquot portion of the reaction product, freezing the same of solvent and then ascertaining the ultraviolet absorption and infrared absorption spectra of it. The material remaining after the removal of solvent is a colorless glass typically weighing about 0.9 gram and having typically an ultraviolet absorption value of E(1%, 1 cm.) (268 mμ, ethanol)=225. The formula of the salt is:

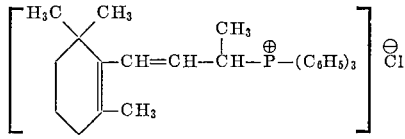

This salt is useful as an intermediate in the preparation of, for example, a carotenoid having pigmenting activity for the skin and eggs of poultry. Thus, for example, the remainder of the reaction product just obtained can be admixed with 1.0 gram (0.0035 mole) of retinal according to the procedure set forth in Example 2. The reaction product thus obtained is typically red and contains an insoluble, viscous oil. Ether extraction of the red reaction product gives a crude concentrate. A typical quantity of the crude concentrate is 4.33 grams. A typical ultraviolet absorption measurement of the crude concentrate is E(1%, 1 cm.) (386 mμ, cyclohexane)=855. Purification of the crude concentrate by successive chromatography on 100 grams of sodium aluminum silicate and 100 grams of activated alumina (F–20 Alcoa) gives the carotenoid, a $C_{33}$ hydrocarbon, having the following formula:

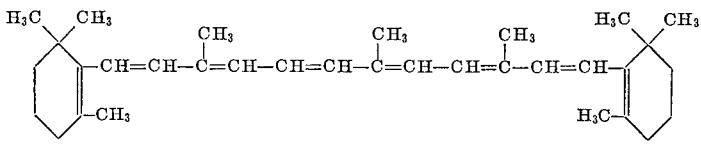

The chemical name of this compound is 1,12-bis(2,6,6-trimethylcyclohex - 1 - enyl) - 3,7,10 - trimethyldodec-1,3,5,7,9,11-hexane. At room temperature it is an orange, semi-solid oil. It has a typical ultraviolet light absorption value of E(1%, 1 cm.) (395 mμ, cyclohexane)=1425. A typical quantity of the compound obtained under these conditions is about 1.2 grams.

EXAMPLE 6

This example illustrates the preparation according to a specific embodiment of this invention of a cinnamyl triphenylphosphonium salt.

A solution consisting essentially of 0.365 gram (0.01 mole) of hydrogen chloride and 2.7 milliliters of methanol is added over a period of 20 minutes to a stirred mixture at 25–30° C. and consisting essentially of 1.76 grams (0.01 mole) of cinnamyl acetate [E(1%, 1 cm.) (252 mμ, cyclohexane)=975], 2.86 grams (0.011 mole) of triphenylphosphine and 4 milliliters of methanol. The mixture thus obtained is stirred at 25–30° C. for two hours whereby a reaction product is formed. It consists essentially of cinnamyl triphenylphosphonium chloride. This compound has the following structural formula:

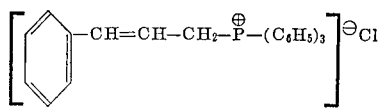

This can be verified by taking a 2 milliliter aliquot sample of the reaction product and freeing the same of solvent. The material remaining after solvent removal is a colorless glass, weighing typically about 0.7 gram and having an ultraviolet absorption value of E(1%, 1 cm.) (254 mμ, cyclohexane)=460. Infrared absorption measurements also verify the structure.

This compound is useful an an intermediate in the synthesis of, for example, a carotenoid compound useful as a feed additive for poultry for pigmenting poultry skin and eggs. This carotenoid is synthesized by coupling the salt, without necessarily removing it from the reaction product, with 2.5 grams (0.0088 mole) of retinal according to the procedure of Example 2. The reaction product thus obtained is red and at room temperature contains an insoluble, viscous oil. Ether extraction of the reaction product gives a crude concentrate, a typical quantity being 5.57 grams, and a typical ultraviolet absorption value thereof being E(1%, 1 cm.) (405 mμ, cyclohexane)=525. After chromatography on 100 grams of sodium aluminum silicate, a filtrate residue is obtained which typically crystallizes from methanol-ether at 5° C. to give a pure $C_{29}$ hydrocarbon of the following formula:

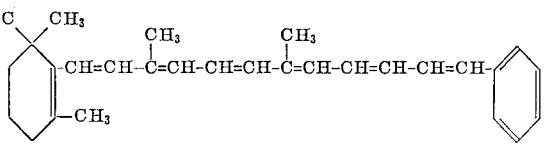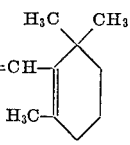

The name of the compound is 1-(2,6,6-trimethylcyclohex - 1 - enyl)-12-phenyl-3,7-dimethyldodec-1,3,5,7,9,11-hexaene. This compound is typically at 20–25° C. an orange solid having an ultraviolet absorption measurement of E(1%, 1 cm.) (416 mμ)=2380.

EXAMPLE 7

This example illustrates the preparation according to a specific embodiment of this invention of an allyl triphenylphosphonium salt.

A solution of 0.36 gram (0.01 mole) of hydrogen chloride and 2.7 milliliters of methanol is added to 1 gram (0.01 mole) of allyl acetate, 2.86 grams (0.011 mole) of triphenylphosphine and 4 milliliters of methanol, and the resulting mixture is refluxed (at a temperature of about 65–70° C.) for two hours. The reaction product thus obtained is cooled to 5° C., held at this temperature for one hour and then filtered. The filter cake of white solids is unreacted triphenylphosphine as can be confirmed by infrared analysis. A typical quantity of this unreacted triphenylphosphine under these condtions is 1.68 grams (0.0064 mole). The filtrate is freed of methanol by distillation and the residual oil is triturated three times with 25 milliliter portions of diethylether. The ether extracts typically contain unreacted triphenylphosphine. A typical quantity of triphenylphosphine thus recovered is 0.6 gram (0.0023 mole). The ether insoluble fraction is typically a colorless glass. It is allyl triphenylphosphine chloride which has the formula:

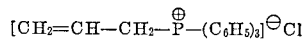

A typical quantity of the salt obtained under these conditions is 1.0 gram. This compound is useful as an intermediate in the synthesis of other compounds.

EXAMPLE 8

This example illustrates the preparation according to a specific embodiment of this invention of a benzyl triphenylphosphonium salt.

A solution consisting essentially of 0.295 gram (0.0081 mole) of hydrogen chloride and 2.19 milliliters of methanol is added to 1.05 grams (0.007 mole) of benzyl acetate, 2.1 grams (0.008 mole) of triphenylphosphine, and 4 milliliters of methanol. The resulting mixture is refluxed (at a temperature of approximately 65–70° C.) for two hours. After cooling of the resulting reaction mixture to 5° C., it is filtered. The filter cake thus obtained is unreacted triphenylphosphine. A quantity of unreacted triphenylphosphine thus recovered is typically 0.85 gram (0.0032 mole). The filtrate is freed of methanol by distillation and the residual oil is triturated three times with 25 milliliter portions of diethylether. The ether soluble material, typically 1.5 grams, comprises a mixture of benzyl alcohol, triphenylphosphine and benzyl triphenylphosphonium chloride. The ether insoluble material, a typical quantity being 1.04 grams, is an oil at 20–25° C. It consists essentially of benzyl triphenylphosphonium chloride. The formula of this quaternary phosphonium salt is:

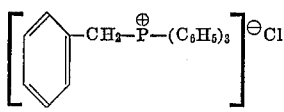

This compound is useful as an intermediate in the synthesis of other compounds.

EXAMPLE 9

This example illustrates the preparation according to a specific embodiment of this invention of an ethyl lactyl triphenylphosphonium salt.

A solution consisting essentially of 0.295 gram (0.0081 mole) of hydrogen chloride and 2.2 milliliters of methanol is added to 1.3 grams (0.0081 mole) of ethyl lactyl acetate, 2.3 grams (0.0089 mole) of triphenylphosphine and 3.2 milliliters of methanol. The resulting mixture is refluxed (at a temperature of about 65–70° C.) for two hours. Thereafter, the reaction product thus formed, is cooled to 5° C. and filtered. The filter cake comprises unreacted triphenylphosphine. A typical quantity of filter cake in the liquid-free condition is 1.35 grams (0.0052 mole). The filtrate is freed of methanol by distillation and the residual oil triturated three times with 25 milliliter portions of diethylether. The ether soluble material is a mixture of ethyl lactate and the desired quaternary phosphonium salt, namely ethyl lactyl triphenylphosphonium chloride. A typical quantity of the ether soluble material thus obtained is 0.7 gram. The ether-insoluble material is predominantly ethyl lactyl triphenylphosphonium chloride which has the formula:

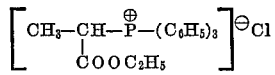

A typical quantity of the ether-insoluble material is 1.1 grams. It is useful as an intermediate in the synthesis of other compounds.

Thus, this invention provides a process for making various quaternary phosphonium salts directly from certain esters. In particular, this invention enables retinyl triphenylphosphonium salt to be made directly from a retinyl ester.

Other features, advantages and specific embodiments of this invention will be readily apparent to those in the exercise of ordinary skill in the art after reading the foregoing disclosures. In this connection, although specific embodiments of this invention have been described in considerable detail, variations and modifications of them can be effected without departing from the spirit and scope of the invention as described and claimed.

I claim:
1. A process for making a quaternary phosphonium salt represented by the Formula I:

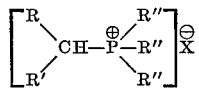

wherein R is selected from the group consisting of hydrogen and methyl radicals, R' is selected from the group consisting of (1) aliphatic, carbocyclic and carbocyclic-aliphatic radicals, each of which has olefinic unsaturation at least at the α carbon atom, and (2) carbalkoxy radicals wherein the alkoxy moieties have 1–8 carbon atoms, each R″ is independently selected from the group consisting of substituted and unsubstituted, saturated and unsaturated, aliphatic, carbocyclic and carbocyclic-aliphatic radicals, and X is an anion of a strong acid, which comprises: admixing (A) an ester represented by the formula:

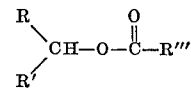

wherein R and R' have the same significance as in Formula I and R‴ is an aliphatic hydrocarbon radical, and (B) a tertiary phosphine salt represented by the formula:

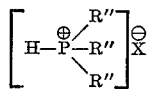

wherein R″ and X have the same significance as in Formula I, whereby a reaction product consisting essentially of a quaternary phosphonium salt represented by Formula I is formed.

2. A process for making a quaternary phosphonium salt represented by the Formula I:

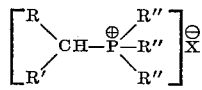

wherein R is selected from the group consisting of hydrogen and methyl radicals, R' is selected from the group consisting of (1) aliphatic, carbocyclic and carbocyclic-aliphatic radicals, each of which has olefinic unsaturation at least at the α carbon atom, and (2) carbalkoxy radicals wherein the alkoxy moieties have 1–8 carbon atoms, each R″ is independently selected from the group consisting of substituted and unsubstituted, saturated and unsaturated, aliphatic, carbocyclic and carbocyclic-aliphatic radicals, and X is an anion of a strong acid, which comprises: admixing in a liquid reaction medium consisting essentially of an inert, $C_1$–$C_8$ alkyl, monohydric alcohol at a temperature in a range from about 20 to about 150° C. for a period of time from about one-half hour to about four hours (A) an ester represented by the formula:

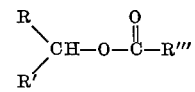

wherein R and R' have the same significance as in Formula I and R‴ is an aliphatic hydrocarbon radical, and (B) at least a chemically equivalent quantity of a tertiary phosphine salt represented by the formula:

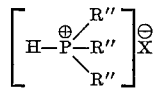

wherein R″ and X have the same significance as in Formula I, whereby a reaction product consisting essentially of a quaternary phosphonium salt represented by Formula I is formed.

3. A process for making a quaternary phosphonium salt represented by the Formula I:

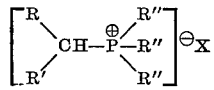

wherein R is selected from the group consisting of hydrogen and methyl radicals, R' is selected from the group consisting of (1) aliphatic, carbocyclic and carbocyclic-aliphatic radicals, each of which has olefinic unsaturation at least at the α carbon atom, and (2) carbalkoxy radicals wherein the alkoxy moieties have 1–8 carbon atoms, each R″ is independently selected from the group consisting of substituted and unsubstituted, saturated and unsaturated, aliphatic, carbocyclic and carbocyclic-aliphatic radicals, and X is an anion of a strong acid, which comprises: dissolving in a liquid reaction medium consisting essentially of an inert $C_1$–$C_8$ alkyl, monohydric alcohol (A) an ester represented by the formula:

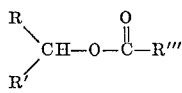

wherein R and R' have the same significance as in Formula I and R''' is an aliphatic hydrocarbon radical, and (B) a quantity, at least chemically equivalent to said ester, of a tertiary phosphine represented by the formula:

wherein R'' has the same significance as in Formula I, whereby a first reaction mixture portion is formed; admixing in a liquid reaction medium consisting essentially of an inert $C_1$–$C_8$ alkyl, monohydric alcohol a quantity of strong acid at least chemically equivalent to said tertiary phosphine, whereby a second reaction mixture portion is formed; adding said second reaction mixture portion to said first reaction mixture portion, whereby a reaction mixture is formed; and then stirring said reaction mixture at a temperature in a range from about 20–150° C. for a period of time in a range from about one-half hour to about four hours.

4. A process for making a rentinyl triphenylphosphine salt, which comprises: admixing in a liquid reaction medium consisting esentially of an inert $C_1$–$C_8$ alkyl, monohydric alcohol at a temperature of 25–30° C. (A) an ester of retinol and an aliphatic carboxyclic acid and (B) a quantity, at least chemicaly equivalent to said ester, of a tertiary phosphine of the formula:

wherein each R'' is independently selected from the group consisting of substituted and unsubstituted, saturated and unsaturated, aliphatic, carbocyclic and carbocyclic-aliphatic radicals, whereby a first reaction mixture portion is formed; admixing a liquid reaction medium consisting essentially of an inert, $C_1$–$C_8$ alkyl, monohydric alcohol and a quantity of a strong acid at least chemically equivalent to said tertiary phosphine, whereby a second reaction mixture portion is formed; admixing said second reaction mixture portion with said first reaction mixture portion, whereby a reaction mixture is formed; and stirring said reaction mixture at 25–30° C. for a period of time in a range from about one-half hour to about four hours.

5. A process according to claim 4, wherein said ester is retinyl acetate.

6. A process according to claim 4, wherein said ester is retinyl acetate, said tertiary phosphine is triphenylphosphine and said alcohol in each case is methanol.

7. A process according to claim 4, wherein said ester is retinyl palmitate.

8. A process according to claim 4, wherein said ester is retinyl palmitate, said tertiary phosphine is triphenylphosphine and said alcohol in each case is methanol.

9. A process for making a β-ionylideneethyl triphenylphosphine salt, which comprises: admixing in a liquid reaction medium consisting essentially of an inert $C_1$–$C_8$ alkyl, monohydric alcohol at a temperature of 25–30° C. (A) an ester of β-ionylideneethanol and an aliphatic carboxylic acid and (B) a quantity, at least chemically equivalent to said ester, of a tertiary phosphine of the formula:

wherein each R'' is independently selected from the group consisting of substituted and unsubstituted, saturated and unsaturated, aliphatic, carbocyclic and carbocyclic-aliphatic radicals, whereby a first reaction mixture portion is formed; admixing a liquid reaction medium consisting essentially of an inert, $C_1$–$C_8$ alkyl, monohydric alcohol and a quantity of a strong acid at least chemically equivalent to said tertiary phosphine, whereby a second reaction mixture portion is formed; admixing said second reaction mixture portion with said first reaction mixture portion, whereby a reaction mixture is formed; and stirring said reaction mixture at 25–30° C. for a period of time in a range from about one-half hour to about four hours.

10. A process according to claim 9, wherein said ester is β-ionylideneethyl acetate.

11. A process for making a β-ionyl triphenylphosphine salt, which comprises: admixing in a liquid reaction medium consisting esentially of an inert $C_1$–$C_8$ alkyl, monohydric alcohol at a temperature of 25–30° C. (A) an ester of β-ionol and an aliphatic carboxyclic acid and (B) a quantity, at least chemicaly equivalent to said ester, of a tertiary phosphine of the formula:

wherein each R'' is independently selected from the group consisting of substituted and unsubstituted, saturated and unsaturated, aliphatic, carbocyclic and carbocyclic-aliphatic radicals, whereby a first reaction mixture portion is formed; admixing a liquid reaction medium consisting essentially of an inert, $C_1$–$C_8$ alkyl, monohydric alcohol and a quantity of a strong acid at least chemically equivalent to said tertiary phosphine, whereby a second reaction mixture portion is formed; admixing said second reaction mixture portion with said first reaction mixture portion, whereby a reaction mixture is formed; and stirring said reaction mixture at 25–30° C. for a period of time in a range from about one-half hour to about four hours.

12. A process according to claim 11, wherein said ester is β-ionyl acetate.

13. A process for making a cinnamyl triphenylphosphine salt, which comprises: admixing in a liquid reaction medium consisting essentially of an inert $C_1$–$C_8$ alkyl, monohydric alcohol at a temperature of 25–30° C. (A) an ester of cinnamol and an aliphatic carboxylic acid and (B) a quantity, at least chemically equivalent to said ester, of a tertiary phosphine of the formula:

wherein each R'' is independently selected from the group consisting of substituted and unsubstituted, saturated and unsaturated, aliphatic, carbocyclic and carbocyclic-aliphatic radicals, whereby a first reaction mixture portion is formed; admixing a liquid reaction medium consisting essentially of an inert, $C_1$–$C_8$ alkyl, monohydric alcohol and a quantity of a strong acid at least chemically equivalent to said tertiary phosphine, whereby a second reaction mixture portion is formed; admixing said second reaction mixture portion with said first reaction mixture portion, whereby a reaction mixture is formed; and stirring said reaction mixture at 25–30° C. for a period of time in a range from about one-half hour to about four hours.

14. A process according to claim 13, wherein said ester is cinnamyl acetate.

15. A process for the production of quaternary axerophthyl phosphonium salts which comprises: reacting an ester of axerophthol with a member selected from the group consisting of a tertiary phosphine and a hydrosalt of a tertiary phosphine, with the proviso that where a tertiary phosphine is used as the reactant, an acid which will form with the tertiary phosphine a hydrosalt is present in the reaction mixture.

16. A process as in claim 15 wherein the tertiary phosphine is triaryl phosphine.

17. A process as in claim 15 wherein the reaction is carried out at a temperature between 20 and 80° C.

18. A process as in claim 15 wherein the reaction is carried out in the presence of an inert organic solvent.

19. A process as in claim 15 wherein an acid selected from the group consisting of sulfuric acid, and toluene sulfonic acid is used as the acid which will form hydrosalts with said tertiary phosphine.

References Cited

UNITED STATES PATENTS 3,294,844  12/1966  Sarneeki et al. _____ 260—606.5

TOBIAS E. LEVOW, Primary Examiner

W. F. W. BELLAMY, Assistant Examiner

U.S. Cl. X.R.

99—4; 260—666

PO-1050
(5/69)

UNITED STATES PATENT OFFICE
CERTIFICATE OF CORRECTION

Patent No. 3,517,067            Dated    June 23, 1970

Inventor(s) Max H. Stern

It is certified that error appears in the above-identified patent and that said Letters Patent are hereby corrected as shown below:

Col. 3, line 30, for "Dicyclohexylmethylphenyl phosphine" read --Dicyclohexylmethylphosphine
-Dicyclohexylphenylphosphine--. Col. 4, line 11, between "a" and "second" insert --first reaction mixture portion while the strong acid is dissolved in a monohydric lower alkyl alcohol to form a--. Col. 5, line 3, for "0.5°C" read --0-5°C--; line 24, for "plamitate" read --palmitate--; line 31, for "palmiate" read --palmitate--; line 65 for "warn" read --warm--. Col. 6, line 20, for "$R_3C$" read --$H_3C$--; last line, for "freezing" read --freeing--. Col. 7, line 40, for "hexane" read --hexaene--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents